2,744,886
Patented May 8, 1956

2,744,886

ACCELERATION OF POLYMERIZATION OF ACRYLATE ESTERS WITH A THIOPHENOL, A DIACYL PEROXIDE, AND A TERTIARY AMINE

Thomas F. Protzman, Levittown, Pa., assignor to Rohm & Haas Company, Philadelphia, Pa., a corporation of Delaware No Drawing. Application August 4, 1954, Serial No. 447,889

4 Claims. (Cl. 260—89.5)

This invention relates to a process for polymerizing esters of acrylic and methacrylic acids. It deals with a process wherein said esters are polymerized under the influence of an organic peroxide as polymerization initiator in the presence of a tertiary aryl or aralkyl amine as activator and of a thiophenol as promotor. The presence of the activator and promotor in proper proportions greatly accelerates polymerization and permits polymerization to be effected at relatively low temperatures in a relatively short time without development of objectionable color. This invention is also concerned with compositions comprising an acrylic ester, an organic peroxide, a tertiary amine having an aryl substituent, and a thiophenol, all in proper proportions.

It is well known that many organic peroxides can initiate polymerization of acrylic monomers at somewhat elevated temperatures. The rate of polymerization with a given peroxide depends primarily upon the concentration of the peroxide and the temperature. Presence of a polymerization inhibitor, however, may delay or prevent polymerization at an otherwise effective temperature or require larger concentrations of initiator and/or higher temperatures. Yet added inhibitors are generally necessary to prevent the premature polymerization of monomers. Furthermore, the presence of air or oxygen usually acts as an inhibitor and various dyes and pigments may act in the same way. It is, therefore, desirable to develop polymerizing systems which can act efficiently in the presence of inhibiting substances, including added inhibitors, oxygen, dyes, pigments, or other materials acting in this way which are used in the preparation of plastic bodies.

It is also desirable to develop polymerizing systems which can cause controlled polymerization of acrylic esters at relatively low temperatures within short periods of time. Such systems would permit new techniques in the production and utilization of acrylic polymers.

In a somewhat analogous field it has been proposed that the copolymerization of preformed unsaturated alkyd resins with a monovinylidene compound such as styrene be accelerated at reduced temperatures by using a peroxidic initiator and dimethylaniline or other dialkylarylamine as activator. Here the monovinylidene compound can undergo addition polymerization, particularly with th olefinic linkages of the preformed resin and with formation of cross-linkages which cause gelation. In the presence of peroxide and dialkylaniline gelation begins in a relatively short time and at a low level of conversion. Polymerization then proceeds gradually, if left undisturbed, with a hard solid stage being ultimately reached.

When peroxide and dialkylaniline are applied to the linear polymerization of monovinylidene compounds, some of these compounds fail to respond at reduced temperatures. While I have observed that polymerization of some esters of methacrylic acid can be accelerated at reduced temperatures and polymerization of esters of acrylic acid is perhaps slightly accelerated by use of organic peroxide and amine, the concentration of the amine required to be markedly effective below 50° C. is sufficient to impart considerable color to the resulting polymer either when made or as the polymer ages. Color stability is poor in any case. Such color is, of course, objectionable and lack of color stability even more objectionable.

I have discovered that the accelerating effect of tertiary amines having an aryl group can be advantageously utilized and extended in the polymerization of esters of acrylic and methacrylic acid with an organic peroxide when there is also present a thiophenol in a small but promoting proportion. This is an unexpected result because of the known effect of polymerization regulators some of which contain the thiol group.

According to this discovery a polymerizable composition is prepared by mixing together an alkyl acrylate or methacrylate, an organic peroxide, a tertiary amine having an aryl substituent, and a thiophenol. The organic peroxide in broadest terms is used in an amount of 0.002% to 2% of the weight of the polymerizable mixture. With acrylates the concentration is preferably 0.05% to 0.5%, while with methacrylates the optimum range is from about 0.1% to about 1%. The amine is used within the range of 0.001% to 2% of the weight of the polymerizable mixture with adjustment of concentration for the particular amine used. The amount of thiophenol present is within the range of about 0.002% to about 0.09%, the concentration being limited to a level giving promoting action.

The acrylic esters which are used in formulating a polymerizable composition are primarily alkyl acrylates and methacrylates. The alkyl group may be large or small, branched or straight-chained. Equivalent to the alkyl esters are cycloalkyl and benzyl acrylates and methacrylates. Typical esters are methyl, ethyl, propyl, isopropyl, butyl, isobutyl, sec-butyl, tert-butyl, amyl, hexyl, octyl, nonyl, decyl, dodecyl, hexadecyl, octadecyl, cyclohexyl, benzyl, chlorobenzyl, and trichloroethyl acrylate and methacrylate. The usual ester may be represented by the formula $$ROOCC(R^x)=CH_2$$

where $R^x$ is hydrogen or methyl and R is commonly alkyl. 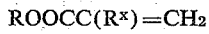

There may be used in conjunction with an acrylic ester or a mixture of such esters one or more miscible, compatible, free-radical copolymerizable, other monovinylidene monomers in a minor proportion. Usually such other monovinylidene compound is used in an amount of not over 30% of the polymerizable mixture, but in some cases the proportion of compatible copolymer does not reach this limit. For example, not over 20% of the polymerizable mixture should be vinyl acetate or propionate. There may similarly be used in proportions of not over 30% acrylonitrile, methacrylonitrile, acrylamide, N-methylacrylamide, methacrylamide, and other similar amides, glycidyl acrylate, glycidyl methacrylate, acrylic or methacrylic acid or dimethyl itaconate. Some of these substances by themselves show no acceleration in polymerization from the addition of initiator with activator and/or promotor of this invention. It is, therefore, understandable that only limited amounts of the above and practically none of other monovinylidene compounds can be used.

The acrylic esters may also be polymerized in the presence of saturated linear polymers which are soluble therein. Thus, a powdered acrylic resin may be dissolved in an alkyl acrylate or methacrylate or a mixture of these esters. There may thus be used poly(methyl methacrylate), poly(ethyl acrylate-methyl acrylate), or like polymer.

Instead of relying upon a separately formed saturated linear polymer, I may form polymer in situ at a relatively low level of conversion, but one sufficient to increase the viscosity of the composition. This may be done by adding an organic peroxide, best at a low concentration, for example, below 0.1%, and heating between 50° and 100° C. until sufficient polymerization has occurred to impart a definite increase in viscosity, but short of the Trommsdorff peak. The resulting thickened solution is now cooled below 50° C. and treated with additional peroxide, amine having an aryl group in its structure, and a thiophenol, all in prescribed proportions. This method may have economic advantages.

The peroxides which act as polymerization initiators in the system of this invention are in general diacyl peroxides $(RCO)_2O_2$, where R is phenyl or alkyl. The preferred peroxides are benzoyl peroxide or alkanoyl peroxides from caproyl to lauroyl, although acetyl peroxide and butyryl peroxides have also been shown effective. Alkyl and chloro substituted benzoyl peroxides have been found effective, such as dimethylbenzoyl peroxide and 2,4-dichlorobenzoyl peroxide. Preferred concentrations of diacyl peroxide are from 0.1% to 1% of the weight of the polymerizable composition.

The amines which serve as activators must contain an aryl substituent in some part of the molecule. The most important group of such amines comprises the N,N-dialkyl-N-arylamines, particularly the dialkylphenylamines which have N-alkyl groups of not over four carbon atoms. There may thus be present methyl, ethyl, propyl, or butyl groups as N-substituents. There may be used not only the phenyl group itself, but also the naphthyl group, although the latter is generally associated with more color in the amine. Also, the phenyl group may have neutral substituents, such as alkyl, preferably in the para position, examples of such groups being methylphenyl, isopropylphenyl, butylphenyl, octylphenyl, and butylnaphthyl. Other hydrocarbon groups may be used in the same way, including phenyl, cyclohexyl, and benzyl. There may be more than one N-phenyl substituent.

The benzyl group may also be used as an N-substituent and while it may replace the N-alkyl groups, it also supplies the required aryl group. Tribenzylamine, for example, is effective as an activator. The alkyl groups may also be replaced with hydroxyalkyl radicals.

Amines effective as activators may be summarized by the formula

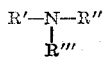

where R' represents an alkyl or benzyl group or a hydroxyalkyl group, R" represents an alkyl, benzyl, or phenyl group, or a hydroxyalkyl group, and R'" represents an aryl group, preferably phenyl, or benzyl. The aryl groups are not over one carbon atom removed from the nitrogen atom when not directly attached.

Amounts of amine are taken sufficient to supply the desired activating action. In general this amount falls within the range between 0.001% and 2% with allowance for the type and size of the particular amine or amines selected. With dimethylaniline or diethylaniline preferred concentrations are 0.01% to 0.1% of the weight of the polymerizable composition. Somewhat more of dipropylaniline or dibutylaniline is optimum, the increased amount being about proportional to the larger molecular weights. This is also true where the benzyl group is used, except that with tribenzylamine amounts up to 2% are useful with 0.5% to 1.5% being now preferred. N-methyl-N,N-diphenylamine may be used over a considerable range, such as preferably 0.05% to 0.5%. N,N-dimethylnaphthylamine is generally used at 0.02% to 0.1%.

Thiophenol itself is a most effective promotor and can be used from 0.002% up to about 0.08% with concentrations of 0.01% to 0.04% being preferred. There may likewise be used the alkyl phenyl thiols, such as

or $C_4H_9C_6H_4SH$, and also mercaptonaphthalene. These substituted phenylthiols may be used in amounts somewhat above 0.08% in proportion to their larger molecular weights as compared to thiophenol itself.

The advantageous influence of the catalyst system—peroxide initiator, amine activator, and thiophenol promotor—is observed from about −20° C. up to 100° C., even though the temperature range of 0° to 50° C. is ordinarily of greatest interest. At the low temperatures a longer time is necessary for high extent of polymerization. For example, at 1° C. a time of 96 hours was observed in the polymerization of methyl methacrylate, whereas with the same system comparable polymerization was obtained in less than four hours at 25° C.

In polymerizing acrylic esters under the conditions of this invention it is evident that polymerization commences even at temperatures below zero, proceeds slowly, and suddenly advances more rapidly. The course of polymerization can conveniently be followed with a thermocouple. The stage at which polymerization proceeds more rapidly is shown by a sudden increase in temperature followed by a drop in temperature. At this point polymerization is far advanced and for many purposes is sufficient. Yet, if desired, the small proportion of monomer which may remain after this peak in temperature can be substantially completely converted to polymer by heating the polymeric material after the sudden rise in temperature at 100°–120° C. for 5 to 150 minutes. Further heating to about 140° C. for one to 30 minutes may be used to shrink the polymeric product, when such an operation is called for. Both temperatures and times may be varied with choice of polymer or copolymer and catalyst system. In any case it is clear that very little material remains to be polymerized after the sudden rise in temperature and further processing is used only to disposed of small amounts of monomer and to exert usual physical effects.

It should be pointed out that the catalyst system above described speeds up not only the initial rate, as do some other combinations, but also the over-all polymerization rate, which is decidedly unusual.

The polymerizable compositions may contain as desired commonly utilized additives such as release agents, stabilizers, plasticizers, dyes, pigments, and the like.

Polymerization of the compositions of this invention may be effected in bulk, in solution, in suspension or bead form, or in emulsion. As solvents there may be used naphtha, aromatic hydrocarbons including benzene, toluene, xylene, and aromatic distillates, alcohols such as methyl, ethyl, or butyl, esters such as ethyl or butyl acetate, chlorinated solvents, ethers, including ethyl and isopropyl ethers and dioxane, ketones, and other inert organic solvents and mixtures thereof. The solvent solutions may contain from 5% to 60% or even more of monomer or monomer-polymer mixture. Suspension and emulsion processes are carried out in conventional manner in the presence of suspending agents or emulsifying agents. In these variations of procedure the catalyst system of this invention brings the advantage of operating at low temperatures with high yields of polymer.

The polymers can be used as moldings, castings, or impregnates. They may be used in laminating and in reenforcing.

Typical procedures for forming polymerizable compositions and effecting their polymerization are described in the following illustrative examples. Parts are by weight.

*Example 1*

A solution is made of 35 parts of polymethyl methacrylate molding powder in 65 parts of pure methyl methacrylate. There are mixed 89 parts of this solution and 11 parts of a solution containing 0.5 part of benzoyl peroxide in methyl methacrylate. Thereto is added 0.02 part of thiophenol followed by a solution of 0.1 part of dimethylaniline in 0.4 part of methyl methacrylate. The total mixture is well stirred and run into a cell formed from two pieces of plate glass spaced apart by rubber tubing. The opening of the cell is sealed with paper. The cell is maintained at 25° C. After 1.5 hours a rapid rise in temperature of the polymerizing mixture is noted. The cell is then placed in an oven at 110° C. and held at this temperature for two hours. The resulting sheet has a Rockwell hardness (M-scale) of 95, a heat distortion temperature of 96° C., a Charpy impact strength of 2.6 ft. lbs., a fluxural strength of 15,900 p. s. i., and a flexural modulus of 417,000 p. s. i. The edge color has a value of 2 on a standard scale.

Example 2

The procedure of Example 1 is followed exactly through the two hour treatment at 110° C. The sheet upon removal from the cell is heated at 140° C. for 20 minutes. This sheet has a Rockwell hardness (M-scale) of 94, a heat distortion temperature of 94° C., a Charpy impact strength of 3.6 ft. lbs., a fluxural strength of 16,000 p. s. i., and a flexural modulus of 428,000 p. s. i.

Example 3

The procedure of Example 1 is followed with use of 0.7 part of benzoyl peroxide in place of the above 0.5 part. The peak temperature in this case is reached at about 1.5 hours. The cell is then heated at 110° C. for two hours. The resulting sheet has a Rockwell hardness (M-scale) of 97, a heat distortion temperature of 101° C., a Charpy impact strength of 3.9 ft. lbs., a fluxural strength of 18,000 p. s. i., and a flexural modulus of 457,000 p. s. i. The color is 1.5.

Example 4

The procedure of Example 2 is followed except for use of 0.7 part of benzoyl peroxide. This sheet has a Rockwell hardness of 95, a Charpy impact strength of 4.2 ft. lbs., a flexural strength of 18,400 p. s. i., a flexural modulus of 456,000 p. s. i., and a color of 1.0.

Example 5

The procedure of Example 3 is followed except that 0.06 part of p-toluenethiol is used in place of the thiophenol. The sheet has a Rockwell hardness of 98, a heat distortion temperature of 100° C., a Charpy impact strength of 4.0 ft. lbs., a flexural strength of 18,800, and a color of 0.5.

Example 6

The procedure of Example 4 is followed except for substitution of 0.06 part of p-toluenethiol. Properties are similar to those above, including the color at 0.5.

Example 7

In this example comparison is made of compositions based upon identical starting materials but with and without promotor.

A solution of 35% of methyl methacrylate molding powder in monomeric methyl methacrylate is prepared. To 100 parts of this solution are added 0.7 part of benzoyl peroxide dissolved in 12 parts of methyl methacrylate, 0.01 part of dimethylaniline, and 0.02 part of thiophenol. The mixture is thoroughly stirred and poured into tube formed of cellulose sheet. The tube is placed in a circulating oil bath at 25° C. with a thermocouple attached to the tube. After 2.5 hours a peak in temperature is recorded. After 3.5 hours the tube is removed from the oil bath. A hard, clear, colorless polymer is obtained.

At the same time there is used a mix like that just above except for omission of the thiophenol. A peak temperature is recorded in about seven hours or more.

Example 8

The general procedure of Example 7 is followed except for use of 0.06 part of p-toluenethiol in place of the thiophenol. The peak temperature is recorded in about four hours. A hard, clear, colorless polymer is obtained.

Example 9

To 100 parts of the above solution of molding powder in methyl methacrylate there are added with good stirring 0.7 part of benzoyl peroxide, 0.05 part of dimethylaniline, and 0.05 part of 2-naphthalenethiol. This mixture is held at 25° C. in an oil bath. A peak in temperature is recorded at 1.5 hours. A hard, rigid, clear, but faintly tinted polymer is obtained.

A similar formulation except for omission of the 2-naphthalenethiol is kept at 25° C. After about 2.5 hours a peak temperature is noted.

Example 10

To 100 parts of the above solution of molding powder in methyl methacrylate there are added with stirring 0.7 part of benzoyl peroxide, 0.02 part of N,N-di-n-butylaniline, and 0.01 part of thiophenol. The mixture is poured into a cellulose tube, which is placed in an oil bath at 25° C. In approximately two hours the peak in temperature is recorded. A hard, clear, rigid colorless polymer is obtained.

In a comparison test without thiophenol a peak temperature is reached at four hours.

Example 11

To 100 parts of the solution of molding powder in methyl methacrylate described above there are added with stirring 1.0 part of benzoyl peroxide, 1.0 part of tribenzylamine, and 0.01 part of thiophenol. The additives are dissolved with stirring. The resulting mixture is poured into a cellulose tube and held at 25° C. in an oil bath. At 3.3 hours a peak temperature is recorded. A hard, rigid, clear, colorless polymer is obtained.

A similar formulation except for omission of thiophenol reaches a peak polymerization temperature after nine hours.

Example 12

To 100 parts of the solution of molding powder in methyl methacrylate as described above there are added with stirring 0.1 part of benzoyl peroxide, 0.1 part of dimethylaniline, and 0.01 part of thiophenol. The resulting mixture is placed in a cellulose tube which is held at 25° C. in an oil bath. At three hours a peak in polymerization temperature is recorded. A hard, rigid, clear polymer is formed.

When this procedure was applied to a mixture as above except for omission of thiophenol, the peak polymerization temperature is found after five hours.

A similar formulation except that 0.2 part of thiophenol is used fails to polymerize within 24 hours.

Example 13

To 100 parts of the solution of molding powder in methyl methacrylate there are added 0.7 part of benzoyl peroxide, 0.1 part of N,N-dimethyl-N-1-naphthylamine, and 0.01 part of thiophenol. The mixture is stirred to ensure solution of materials and poured into a cellulose tube. The tube is placed in an oil bath at 25° C. At about 2.5 hours a peak temperature is recorded. A hard, clear, slightly yellowish polymer is obtained.

Example 14

A mixture is prepared as before from 100 parts of the solution of molding powder in methyl methacrylate and one part of benzoyl peroxide. This mixture is chilled to −16° C. and then treated with 0.1 part of dimethylaniline followed by 0.02 part of thiophenol. The final mixture is poured into a cellulose tube and kept at −16° C. When the tube is examined at 48 hours, it is found that a hard, rigid polymer has been formed.

Similarly, 100 parts of pure methyl methacrylate is treated with one part of benzoyl peroxide, 0.1 part of dimethylaniline, and 0.02 part of thiophenol. This mixture is poured into a cellulose tube which is stored in a cold room at −16° C. When the tube is examined a week later, it is found that a hard, rigid, colorless polymer has been formed.

A control mixture free of thiophenol fails to form a hard polymer in this time.

*Example 15*

There are mixed 95 parts of the above monomer-polymer methyl methacrylate solution, 5 parts of methacrylic acid, 0.7 part of benzoyl peroxide, 0.05 part of dimethylaniline, and 0.01 part of thiophenol. This mixture is placed in a cellulose tube which is kept in an oil bath at 25° C. A peak in polymerization temperature is observed at about two hours. A hard, rigid, clear polymer is obtained.

*Example 16*

There are mixed 100 parts of ethyl acrylate, 0.25 part of benzoyl peroxide, 0.01 part of dimethylaniline, and 0.05 part of thiophenol. The mixture is poured into a cellulose tube which is placed in an oil bath at 25° C. A peak temperature is recorded in less than one hour. A clear elastomeric, colorless solid is formed.

A similar formulation which, however, lacks thiophenol is prepared and kept in the same oil bath for 24 hours. Up to that time the mixture remains non-viscous.

*Example 17*

There are mixed 50 parts of lauryl methacrylate and 0.7 part of benzoyl peroxide, which is caused to dissolve with gentle heating in a 50° C. bath. This solution is mixed with 50 parts of a clear light mineral oil, 0.1 part of dimethylaniline, and 0.01 part of thiophenol. This solution is poured into a tube until the tube is almost full and the tube is stoppered so as to leave a bubble. A second tube is filled with a similar solution except for omission of thiophenol. The two tubes are placed in a bath at 25° C. After 24 hours the tubes are examined. The mixture containing thiophenol is viscous; the other is not. It requires 24 seconds for the bubble to rise when the first tube is inverted and 4 seconds for the bubble to rise in the second tube.

*Example 18*

There are mixed 80 parts of methyl methacrylate and 20 parts of acrylonitrile. There are dissolved therein 0.7 part of benzoyl peroxide, 0.1 part of dimethylaniline, and 0.02 part of thiophenol. The resulting solution is poured into a cellulose tube which is placed in an oil bath at 25° C. After about six hours a peak polymerization temperature is recorded. A hard, clear, slightly yellowish solid is obtained.

*Example 19*

There are mixed 80 parts of methyl methacrylate and 20 parts of dimethyl itaconate. In this mixture there are dissolved 0.7 part of benzoyl peroxide, 0.1 part of dimethylaniline, and 0.05 part of thiophenol. The solution is poured into a cellulose tube which is placed in the 25° C. oil bath. After about eight hours a peak polymerization is observed. A hard, clear, yellow solid is obtained.

*Example 20*

In the same way there are mixed 80 parts of methyl methacrylate, 20 parts of vinyl acetate, 0.1 part of benzoyl peroxide, 0.1 part of dimethylaniline, and 0.01 part of thiophenol. The mixture is poured into a cellulose tube which is placed in an oil bath at 50° C. After approximately nine hours a peak in temperature is recorded. A white, clear, solid polymer is obtained.

*Example 21*

There are mixed 100 parts of methyl methacrylate, one part of benzoyl peroxide, 0.01 part of dimethylaniline, and 0.03 part of thiophenol. When solution is complete, the mixture is poured into a cellulose tube which is then placed in an oil bath at 50° C. In about 2.7 hours a peak in temperature is recorded.

A comparable solution containing, however, 0.05 part of dimethylaniline and no thiophenol showed a peak in about 2.6 hours.

*Example 22*

To 100 parts of the monomer-polymer solution prepared as above with molding powder there are added 0.7 part of benzoyl peroxide, 0.1 part of dimethylaniline, 0.02 part of thiophenol, and 0.006 part of hydroquinone. The resulting solution is poured into a cellulose tube which is placed in an oil bath at 25° C. At about 2.2 hours a peak polymerization temperature is reached. A clear, rigid polymer is formed.

A similar formulation except for omission of thiophenol reached a peak temperature after about 12 hours.

*Example 23*

To 100 parts of a solution of molding powder in methyl methacrylate as used above there are added two parts of lauroyl peroxide, 0.1 part of dimethylaniline, and 0.02 part of thiophenol. The materials are dissolved with stirring and the solution is poured into a cellulose tube which is placed in the oil bath at 25° C. After about nine hours a peak in polymerization temperature is recorded. A hard, clear solid is obtained.

A similar formulation without thiophenol shows a peak after 15 hours.

*Example 24*

To 100 parts of a solution of 35% polymethyl methacrylate in monomeric methyl methacrylate there are added 0.7 part of benzoyl peroxide, 0.01 part of p-nitrosodimethylaniline, and 0.02 part of thiophenol. After about three hours at 25° C. a peak temperature is observed. A hard, clear, rigid, but yellowish polymer is obtained.

Repetition of the above procedure with omission of thiophenol yields in 24 hours a flexible yellow polymer.

*Example 25*

To 100 parts of methyl methacrylate there are added 0.5 part of acetyl peroxide, 0.2 part of dimethylaniline, and 0.03 part of thiophenol. This solution was poured into a cellophane-sided cell and maintained at 30° C. In 11 hours a peak temperature is recorded. The product is a hard, clear polymer.

A similar solution but without thiophenol polymerizes in 14 hours. Without either dimethylaniline or thiophenol polymerization of a solution of acetyl peroxide in methyl methacrylate occurs in 18 hours.

The compositions here described and the process of forming polymers therewith have many advantages, some of which will be now mentioned. An important point is that the catalyst system here shown is highly effective even in the presence of inhibitors, whether these be such added substances as hydroquinone, di-β-naphthol, or catechol, naturally occurring inhibitors, air, or dyes, pigments, or other material used in formulating plastic products. It is not necessary, for example, to blanket the polymerizing mixture with an inert gas, such as nitrogen, or to degas mixtures to remove all oxygen, although, if desired, these steps may be taken in conventional ways. Another highly important advantage lies in the low temperatures at which polymerization can be initiated. While temperatures above 50° C. can be used and are at times useful in particular cases, generally starting temperatures between 0° and 50° C. will be used. In fact, it can be said that for the first time a practical system is provided for polymerizing acrylates at temperatures of the order of room temperature. Along with low temperatures there must be considered the matter of time. By utilization of the catalyst system of this invention relatively short polymerization periods become possible with all the significance that this factor alone brings to industrial applications. At the same time this invention makes possible excellent control of polymerizations. There result polymeric products of good color, excellent color stability, and high clarity. The color stability applies to objects subjected to heat or to actinic exposure. Furthermore, there results less color in any case because the catalyst system permits use of a low level of activating amine which is a chief source of objectionable color.

I claim:

1. A process for polymerizing alkyl esters of acrylic and methacrylic acid which comprises mixing together an alkyl ester of an acid from the class consisting of acrylic acid and α-methacrylic acid, a catalytically effective amount of a diacyl peroxide between 0.002% and 2% of the weight of the resulting composition, an activating amount of a tertiary amine having N-substituents from the class consisting of alkyl groups of not over four carbon atoms, the benzyl group, and aryl groups of one to two cycles, there being at least one aromatic cycle in the amine, the amine being used at 0.001% to 2% of the weight of the resulting composition, and a promoting amount of a thiophenol between 0.002% and about 0.09% of the resulting composition, and permitting the resulting composition to polymerize between −20° and 100° C.

2. A process for forming polymers which comprises forming a mixture containing an alkyl ester of an acid from the class consisting of acrylic acid and methacrylic acid, a catalytically effective amount of benzoyl peroxide between 0.002% and 2%, an activating amount of a dialkylaniline having alkyl groups of not over four carbon atoms between about 0.01% and about 0.1%, and a promoting amount of a thiophenol between about 0.01% and about 0.08%, the percentages being based on the weight of the mixture formed, and subjecting the resulting mixture to polymerizing conditions between 0° and 50° C.

3. A process for preparing polymers which comprises forming a mixture containing methyl methacrylate, a catalytically effective amount of benzoyl peroxide between about 0.1% and about 1%, an activating amount of dimethylaniline between about 0.01% and about 0.1%, and a promoting amount of a thiophenol between about 0.01% and about 0.08%, the percentages being based on the weight of the mixture formed, and polymerizing the resulting mixture between 0° and 50° C.

4. A process for preparing polymers which comprises forming a mixture containing an alkyl acrylate, a catalytically effective amount of benzoyl peroxide between about 0.05% and about 5%, an activating amount of dimethylaniline between about 0.01% and about 0.1%, and a promoting amount of a thiophenol between about 0.01% and about 0.08%, the percentages being based on the weight of the mixture formed, and polymerizing the resulting mixture between 0° and 50° C.

References Cited in the file of this patent

UNITED STATES PATENTS

| | | |
|---|---|---|
| 2,416,440 | Fryling | Feb. 25, 1947 |

FOREIGN PATENTS

| | | |
|---|---|---|
| 883,679 | France | Mar. 29, 1943 |